US008805868B2

(12) United States Patent  
Choi et al.

(10) Patent No.: US 8,805,868 B2  
(45) Date of Patent: Aug. 12, 2014

(54) APPARATUS AND METHOD FOR A QUERY EXPRESS

(75) Inventors: Mi-Ran Choi, Daejon (KR); Hee-Cheol Seo, Daejon (KR); Hyun-Ki Kim, Daejon (KR); Myung-Gil Jang, Daejon (KR); Jeong Heo, Daejon (KR); Soo-Jong Lim, Daejon (KR); Yeo-Chan Yoon, Seoul (KR); Kyoung-Ro Yoon, Seoul (KR)

(73) Assignees: Electronics and Telecommunications Research Institute, Daejeon (KR); Konkuk University Industrial Cooperation Corp, Seoul (KR)

( * ) Notice: Subject to any disclaimer, the term of this patent is extended or adjusted under 35 U.S.C. 154(b) by 239 days.

(21) Appl. No.: 12/671,909

(22) PCT Filed: Dec. 27, 2007

(86) PCT No.: PCT/KR2007/006909  
§ 371 (c)(1),  
(2), (4) Date: Feb. 2, 2010

(87) PCT Pub. No.: WO2009/020260  
PCT Pub. Date: Feb. 12, 2009

(65) Prior Publication Data  
US 2011/0179056 A1     Jul. 21, 2011

(30) Foreign Application Priority Data

Aug. 3, 2007  (KR) .................. 10-2007-0078061

(51) Int. Cl.  
*G06F 17/30* (2006.01)

(52) U.S. Cl.  
USPC ........................................ 707/769

(58) Field of Classification Search  
CPC ................................. G06F 17/30132  
USPC ......................... 707/769, 999.004  
See application file for complete search history.

(56) References Cited

U.S. PATENT DOCUMENTS 6,304,864 B1 *  10/2001  Liddy et al. .................. 706/15  
6,490,370 B1    12/2002  Krasinski et al.

(Continued)

FOREIGN PATENT DOCUMENTS

JP      2000-235578 A      8/2000  
JP      2002-536721 A      10/2002

(Continued)

OTHER PUBLICATIONS

Renner, Kerstin, Specification of an MPEG-7 Query Language, Universitat Passau, May 30, 2007.*

(Continued)

*Primary Examiner* — Etienne Leroux

(57) ABSTRACT

Disclosed is an apparatus and method for expressing a query for searching multimedia data. The apparatus and method of the present invention expresses diverse query types in MPEG-7 query formats and uses field types to re¬ use a designated region. The apparatus for expressing a query inputted from a user for multimedia data search includes: an input means for receiving a query for multimedia data search from a user; and a query expression means for expressing the input query in a field type, wherein the field type includes at least one among identifier information indicating identification (ID) information of a field presenting a search condition included in the input query; type information indicating data type information of the field; and reference information indicating identifier information of another field for reference. The present invention is applied to MPEG-7 query formats.

24 Claims, 2 Drawing Sheets

(56) References Cited

U.S. PATENT DOCUMENTS

| | | | |
|---|---|---|---|
| 6,584,459 B1 * | 6/2003 | Chang et al. | .................. 707/812 |
| 2003/0187950 A1 | 10/2003 | Rising, III | |
| 2003/0212662 A1 | 11/2003 | Shin et al. | |
| 2004/0267720 A1 | 12/2004 | Liu et al. | |
| 2005/0171970 A1 | 8/2005 | Ozzie et al. | |
| 2007/0050379 A1 * | 3/2007 | Day et al. | ................... 707/999.1 |
| 2007/0090192 A1 * | 4/2007 | Schmidt et al. | .......... 235/462.46 |

FOREIGN PATENT DOCUMENTS

| | | | |
|---|---|---|---|
| JP | 2004-030569 A | | 1/2004 |
| JP | 2005-505058 A | | 2/2005 |
| JP | 2007-034763 A | | 2/2007 |
| JP | 2007-520810 A | | 7/2007 |
| KR | 1019990086011 A | | 12/1999 |
| KR | 1020010042221 A | | 5/2001 |
| KR | 1020030084418 A | | 11/2003 |
| KR | 1020050065862 A | | 6/2005 |
| KR | 1020060135692 A | | 12/2006 |
| KR | 1020070098469 A | | 10/2007 |
| WO | WO 00/45292 A1 | | 8/2000 |
| WO | WO 03/030031 A2 | | 4/2003 |
| WO | WO 2005/069169 A1 | | 7/2005 |

OTHER PUBLICATIONS

Hee-Cheol Seo et al., "Weak Points of Current MPEG-7 Query Format Schema," International Organization for Standardization Coding of Moving Pictures and Associated Audio, Jul. 2007, pp. 1-5, Lausanne, Switzerland.

International Search Report for PCT/KR2007/006909 filed on Dec. 27, 2007.

Written Opinion of the International Searching Authority for PCT/KR2007/006909 filed on Dec. 27, 2007.

Chrisa Tsinaraki et al., "An MPEG-7 query language and a user preference model that allow semantic retrieval and filtering of multimedia content", Multimedia Systems, Jun. 30, 2007, pp. 131-153, No. 2, vol. 13.

Yang Chu et al., "Looking at Mapping, Indexing & Querying of MPEG-7 Descriptors in RDBMS with SM3", Proceedings of the $2^{nd}$ ACM International Workshop on Multimedia Databases, Jan. 1, 2004, pp. 55-64.

* cited by examiner

APPARATUS AND METHOD FOR A QUERY EXPRESS

This work was supported by the IT R&D program of MIC/IITA [2005-S-117-03, "Development of Intelligent Personal Media Managing Technology for Ubiquitous Environment"].

The present application claims the priority benefit of International Patent Application No. PCT/KR2007/006909, filed on Dec. 27, 2007, which claims the priority benefit of Republic of Korea Patent Application No. 10-2007-0078061, filed on Aug. 3, 2007.

TECHNICAL FIELD

The present invention is related to a query expressing apparatus and method for searching multimedia data; and, more particularly, to a query expressing apparatus and method that can re-use a designated region and express diverse queries in a Moving Picture Experts Group (MPEG) 7 query format for searching multimedia data by using field types to express the queries.

BACKGROUND ART

Searching content-based multimedia data in diverse multimedia environments requires a method of efficiently expressing multimedia contents, and to express diverse data included in a multimedia content, a systematic expression scheme is required.

To fulfill the above requirements, Moving Picture Experts Group (MPEG) 7 defines specifications for descriptors expressing the contents of audio and visual (AV) data, description scheme (DS) defining schema which systematically describes the structure and meaning information of AV data, and Description Definition Language (DDL), which is a language for defining descriptors and description schemes.

The MPEG-7 is related to a structure of metadata for expressing multimedia data such as image, audio, and moving picture.

MPEG-7 query format is a form of a query expressed in MPEG-7 for multimedia data search. MPEG-7 query format defines syntax for searching MPEG-7 documents. In a system for searching MPEG-7 multimedia data, MPEG-7 multimedia data are searched using the MPEG-7 query format.

MPEG-7 query format should be able to exactly express diverse queries from users and diverse query types. For example, there are diverse query types, such as a sentence-type query, e.g., "music video starring Rain", example-based query using a multimedia file itself as a query, and an MPEG-7 textual description-based query. The above diverse query types should be able to be exactly expressed in MPEG-7 query format. Therefore, it is required to develop a query expression method that can exactly express diverse queries and query types in MPEG-7 query formats for MPEG-7 multimedia data search.

Meanwhile, there is a case where different sub-structures belonging to the same region of an MPEG-7 document are referred to in an MPEG-7 multimedia search. In other words, this is a case that more than one search conditions should be all satisfied within the same region of the MPEG-7 document.

To take an example, to search for an MPEG-7 image file having predetermined length and area at a specific position, a specific position is designated at first and the length and area attributes are designated for the specific location. In short, a secondary search is executed within the result of a primary search.

Therefore, to re-use a pre-designated region in an MPEG-7 multimedia data search, a method of expressing queries by using field types is required. Fields used in the present invention expresses a user query as a query for searching multimedia data. Field types specify the attributes of the fields.

Hereinafter, problems of OutputDescriptionType of a conventional MPEG-7 query format defined as the following Table 1 will be discussed.

TABLE 1

```
<complexType name="OutputDescriptionType">
    <sequence>
        <element name="Field" type="mp7qf:FieldType" minOccurs="0" maxOccurs="unbounded"/>
    </sequence>
    <attribute name="maxPageEntries" type="positiveInteger" use="optional"/>
    <attribute name="maxItemCount" type="positiveInteger" use="optional"/>
    <attribute name="freeTextUse" type="boolean" use="optional"/>
    <attribute name="resourceUse" type="boolean" use="optional"/>
    <attribute name="outputNameSpace" type="anyURI" use="required"/>
</complexType>
<complexType name="FieldType">
    <simpleContent>
        <extension base="mpeg7:xPathRefType">
            <attribute name="typeName" type="string" use="optional"/>
        </extension>
    </simpleContent>
</complexType>
```

The OutputDescriptionType is a type of an OutputDescription field indicating an output query result. According to the conventional technology, the OutputDescriptionType cannot express an operation result related to a plurality fields as output. FieldType included in the OutputDescriptionType refers to a specific element or attribute. However, since the FieldType is based on XPath, there are some restrictions in expressing a relationship between element and attribute. Herein, eXtensible Markup Language (XML) Path Language (XPath) is a standard of World Wide Web Consortium (W3C) and it is a language describing a method of arraying and processing elements by using a syntax designated on a path based on a structure of an XML document. XPath uses pass expression to define nodes of an XML document. Besides, it uses mathematics, functions and other extensible expressions.

For example, it is not guaranteed that two XPath expressions //Member/Name/GivenName and //Member/Name/FamilyName extract a given name and a family name of the same member from a document presented in Table 2.

TABLE 2

```
<Creator>
    <Role href="urn:mpeg:mpeg7:cs:RoleCS:2001:ARTIST"/>
    <Agent type="PersonGroupType">
        <Member>
            <Name>
                <GivenName>Mick</GivenName>
                <FamilyName>Jagger</FamilyName>
            </Name>
        </Member>
        <Member>
            <Name>
                <GivenName>Keith</GivenName>
                <FamilyName>Richard</FamilyName>
            </Name>
        </Member>
        <Member>...</Member>
        ...
```

TABLE 2-continued

```
    </Agent>
  </Creator>
```

That is, when a query is expressed with the two XPath expressions //Member/Name/GivenName and //Member/Name/FamilyName, a person whose given name is Mick is extracted and a person whose family name is Jagger can be extracted. However, there is no guarantee that a person whose given name and family name is Mick Jagger is extracted.

As describe above, it is required to develop a query expression apparatus and method that can exactly express diverse queries and diverse query types in an MPEG-7 query format and re-use pre-designated region for MPEG-7 multimedia data search.

DISCLOSURE

Technical Problem

To meet the above requirements, an embodiment of the present invention is directed to providing a query expression apparatus and method that can express diverse query types in Moving Picture Experts Group (MPEG) 7 query format and re-use a pre-designated region for multimedia search by using field types.

Technical Solution

In accordance with an aspect of the present invention, there is an apparatus provided for expressing a query inputted from a user for multimedia data search, which includes: an input means for receiving a query for multimedia data search from a user; and a query expression means for expressing the input query in a field type, wherein the field type includes at least one among identifier information indicating identification (ID) information of a field presenting a search condition included in the input query; type information indicating data type information of the field; and reference information indicating identifier information of another field for reference.

In accordance with another aspect of the present invention, there is provided a method for expressing a query inputted from a user for multimedia data search, which includes: receiving a query for multimedia data search from a user; and expressing the input query in a field type, wherein the field type includes at least one among identifier information indicating identification (ID) information of a field presenting a search condition included in the inputted query; type information indicating data type information of the field; and reference information indicating identifier information of another field for reference.

In accordance with another aspect of the present invention, there is provided a search apparatus for searching multimedia data based on a query inputted from a user, which includes: an expression means for expressing the input query in a field type; and a search means for searching multimedia data based on the query expressed in the field type, wherein the field type includes at least one among identifier information indicating identification (ID) information of a field presenting a search condition included in the inputted query; type information indicating data type information of the field; and reference information indicating identifier information of another field for reference.

In accordance with another aspect of the present invention, there is provided a recording medium for recording a data structure where a query inputted from a user is expressed in a field type for searching multimedia data based on the query, which includes: at least one among identifier information indicating identification (ID) information of a field presenting a search condition included in the inputted query; type information indicating data type information of the field; and reference information indicating identifier information of another field for reference.

Advantageous Effects

The query expression apparatus and method of the present invention for multimedia data search can search Moving Picture Experts Group (MPEG) 7 documents with diverse queries and make a secondary search onto a portion whose range is defined by the primary search.

BEST MODE FOR THE INVENTION

The advantages, features and aspects of the invention will become apparent from the following description of the embodiments with reference to the accompanying drawings, which is set forth hereinafter.

Figure 1:
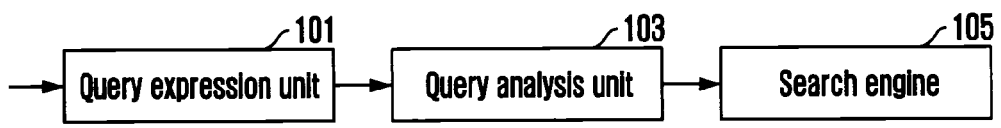
FIG. 1 is a block view showing a query expressing apparatus using field types for searching multimedia data in accordance with an embodiment of the present invention.

FIG. 1 is a block view showing a query expressing apparatus using field types for searching multimedia data in accordance with an embodiment of the present invention.

Referring to FIG. 1, the query expressing apparatus of the present invention includes a query expression unit 101, a query analysis unit 103, and a search engine 105.

The query expression unit 101 expresses a query inputted from a user for searching multimedia data by using field types.

The query analysis unit 103 analyzes the meaning of the query expressed by the query expression unit 101, and the search engine 105 searches for multimedia data related to the query analyzed in the query analysis unit 103.

The query expression unit 101 uses field types to accurately express the meaning of the inputted user query. The field types used in the query expression unit 101 will be described in detail by referring to FIG. 3.

Figure 2:
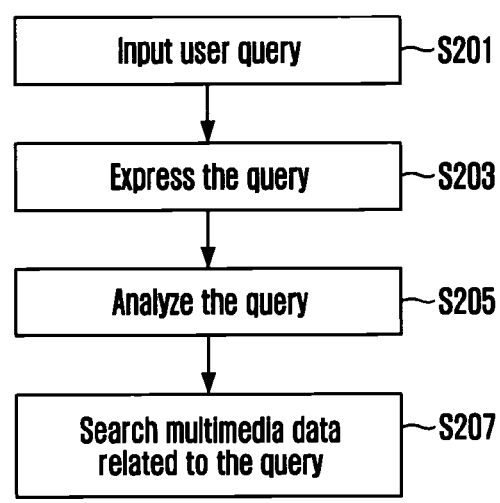
FIG. 2 is a flowchart describing a query expressing method using field types shown in FIG. 1 to search multimedia data in accordance with an embodiment of the present invention.

FIG. 2 is a flowchart describing a query expressing method using field types shown in FIG. 1 to search multimedia data in accordance with an embodiment of the present invention.

As shown in FIG. 2, in step S201, a user inputs a user query into the query expression unit 101. In step S203, the query expression unit 101 expresses the user query as a query for searching multimedia data by using field types.

In step S205, the query analysis unit 103 analyzes the meaning of the query expressed by the query expression unit 101.

In step S207, the search engine 105 searches for multimedia data related to the query whose meaning is analyzed by the query analysis unit 103.

As described above, the method of the present invention includes a query expression step of expressing a user query by using field types, a query analysis step of analyzing the expressed query, and a search step of searching for multimedia data related to the analyzed query.

Figure 3:
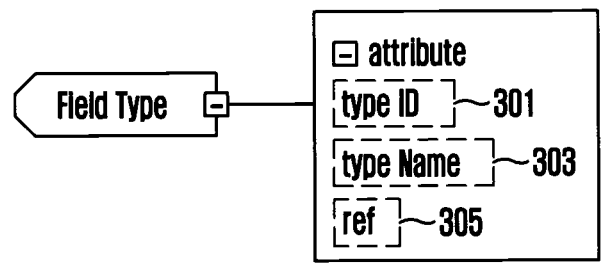
FIG. 3 illustrates field types used in an embodiment of the present invention.

FIG. 3 illustrates field types used in an embodiment of the present invention.

As shown in FIG. 3, the field types used to express a user query as a query for searching multimedia data include a field type identifier (ID) (typeID) 301, a field type name (typeName) 303, and a reference (ref) 305.

The field type includes at least one among ID information of a field indicating a search condition included in the inputted query, type information indicating data type information of the field, and reference information indicating ID information of another field for reference. The ID information corresponds to the typeID 301; the type information, to the typeName 303; and the reference information, to the ref 305, respectively.

The typeID 301 is an identifier assigned to each field used for expressing a user query as a query for searching multimedia data. In other words, the typeID 301 is an ID information unique to the field indicating a search condition included in the user query. The typeID 301 makes fields possible to refer to each other. In short, the typeID 301 is a field type ID (FieldTypeID).

The typeName 303 is type information indicating data type information of the field. The typeName 303 specifies the name of a complex data type defined according to Moving Picture Experts Group 7 (MPEG-7) Standard and limits a field used to express the user query as a query for multimedia data search to a specific data type.

The ref 305 is reference information indicating ID information of anther field. The ref 305 makes it possible to refer to a field identifier including the typeID 301.

For example, Mpeg7//VisualCoding/Frame, which is a Frame part of VisualCoding included in Mpeg-7, can be defined as a field value.

In an MPEG-7 query format, a field used to express a user query as a query for searching multimedia data can be expressed in a complicated XPath and it may be referred during query input or query output.

For a field to be referred to by an operation such as ArithmeticOperands, BooleanOperands, and OutputDescription, an ID attribute (e.g., typeID 301) is added to FieldType.

The following Table 3 shows FieldType of FIG. 3 described in a schema format in accordance with an embodiment of the present invention. A field value is described in an xPath format (Mpeg7:xPathRefType) in the xml schema. In short, FieldType is extended from Mpeg7:xPathRefType. The typeID 301, typeName 303 and ref 305 of FIG. 3 are defined by such attributes as ID, typeName and ref, respectively.

TABLE 3

```
<complexType name="FieldType">
    <simpleContent>
        <extension base="mpeg7:xPathRefType">
            <attribute name="typeID" type=" ID" use="optional"/>
            <attribute name="typeName" type="string" use="optional"/>
            <attribute name="ref" type="IDREF" use="optional"/>
        </extension>
    </simpleContent>
</complexType>
```

An element including a low-level element of FieldType includes an IDREF element referring to a specific field.

As an ID attribute is added to the FieldType, there is no need to define the same field several times, and a predefined field can be referred to anywhere. Also, when the same field exists obviously independently, it can be expressed separately.

The following Table 4 indicates the meaning of a field type of FIG. 3.

TABLE 4

| Name | Definition |
|---|---|
| FieldType | A complex type expanded from an Mpeg7:xPathRefType format. FieldType describes data paths by using metadata of an item. The data paths are described in XPath format, which expresses the metadata of the item. FieldType expresses a selectively related XPath format. The related XPath indicates a complex type of a schema given by outputNameSpace. |
| ID | An identifier assigned to each field. When query is inputted, another field may be referred to by using a field identifier. |
| typeName | typeName describes a schema of other metadata given by outputNameSpace or the name of a complex data type defined in Mpeg7. typeName functions as starting point of related XPath format. |
| Ref | Used to refer to a field ID within a field. |

The item is a basic unit of data used in MPEG-7 multimedia contents. The outputNameSpace specifies Uniform Resource Identifier (URI) of namespace related to the metadata expressed in a Description element. However, outputNameSpace may be namespace related to MPEG-7 or another metadata format. The namespace is a document on a specific website, it checks out names of specific data elements or attributes used within an eXclusive Markup Language (XML) file, when a data set for something is formed and shared by people on the web by using XML. An author of an XML file checks namespace by designating a web address at around starting position of the XML file according to Uniform Resource Locator (URL). An XML parser provided as part of a web browser comes to figure out rules for expression and where it can find different information about the elements of the XML file. For example, the XML document may declare its namespace in a single sentence.

<xmlns:xsl='http://www.anyco.com/xml/schema'>

Then, the XML parser may refer to a definition XSL at an address "http://www.anyco.com/xml/schema" to figure out how to process data of the XML file beginning with a letter "xsl." For example, the XML file entitled "A Modest Proposal" can be analyzed based on XSL definition at "http://www.anyco.com/xml/schema".

Also, since the ID, typeName and Ref can be selectively used, information corresponding to a query can be searched upon receipt of a query format using one of the three informations.

The following Table 5 shows an example of a field type of the xml schema format shown in the Table 3. The Table 5 shows a field type when a user query "search images whose image size (horizontal*vertical) is greater than 1024*768."

TABLE 5

```
<mp7qf:RetrieveData>
    <mp7qf:Field typeID ="M7DocID">/Mpeg7</mp7qf:Field>
    <mp7qf:Field typeID ="VisualCodingFrameID" ref= M7DocID >
//VisualCoding/Frame
    </mp7qf:Field>
    <mp7qf:Condition>
        <mp7qf:ConditionBag operator="AND">
        <!-- target content : Image -->
            <mp7qf:FeatureCondition operator="equalTo">
<mp7qf:SourceFeature ref="M7DocID">
```

TABLE 5-continued

```
//MediaFormat/Content/Name
</mp7qf:SourceFeature>
        <mp7qf:TargetConstantValue
xsi:type="mp7qf:FeatureStringType">
            <mp7qf:value>Image</mp7qf:value>
        </mp7qf:TargetConstantValue>
    </mp7qf:FeatureCondition>
    <!-- sizes are greater than or equal to 1024*768 pixels
(width * height) -->
    <mp7qf:FeatureCondition
operator="greaterThanOREqualTo">
        <mp7qf:SourceFeatureExpression operator="multiply">
            <mp7qf:FeatureName ref="VisualCodingFrameID">
@height
</mp7qf:FeatureName>
            <mp7qf:FeatureName ref="VisualCodingFrameID">
@width
</mp7qf:FeatureName>
        </mp7qf:SourceFeatureExpression>
        <mp7qf:TargetFeatureExpression operator="multiply">
            <mp7qf:ConstantValue
xsi:type="mp7qf:FeatureDecimalType">
                <mp7qf:value>1024</mp7qf:value>
            </mp7qf:ConstantValue>
            <mp7qf:ConstantValue
xsi:type="mp7qf:FeatureDecimalType">
                <mp7qf:value>768</mp7qf:value>
            </mp7qf:ConstantValue>
        </mp7qf:TargetFeatureExpression>
    </mp7qf:FeatureCondition>
    </mp7qf:ConditionBag>
</mp7qf:Condition>
</mp7qf:RetrieveData>
```

In the Table 5, FieldType has such elements as [Field], [SourceFeature], and [FeatureName]. Elements of FieldType are used to express a query conforming to an Mpeg-7 Query Format, and a specific field may be referred to based on the ref 305. As a specific field is referred to, an additional data path can be described to express a region indicated by the field referred to.

An element includes attributes of a field, such as field type ID, field type name, and reference. For example, in the Table 5, elements are <mp7qf:Field typeID="M7DocID">/Mpeg7</mp7qf:Field> and <mp7qf:Field typeID="VisualCodingFrameID" ref="M7DocID">//VisualCoding/Frame</mp7gf:Field>.

The fields of the elements are Mpeg7 and VisualCoding/Frame, respectively.

The typeID 301 of Mpeg7 is M7DocID, and the typeID 301 of VisualCoding/Frame is VisualCodingFrameID. VisualCoding/Frame having the VisualCodingFrameID as the typeID 301 refers to Mpeg7 having M7DocID as a typeID based on the ref 305.

Meanwhile, according to what is defined in Mpeg-7 Query Format, QFDecicaration includes two elements, which are DeclaredField and Resource. According to the present invention, DeclaredField includes ID used for a field to be re-used. QFDeclaration defines QueryCondition defined in Mpeg-7 Standard or resources referred to in order to describe a query condition or result data in OutputDescription.

The following Table 6 illustrates an element of QFDeclaration defined as QFDeclarationType in accordance with an embodiment of the present invention.

TABLE 6

```
<complexType name="QFDeclarationType">
    <sequence>
        <element name="DeclaredField"
type="mpqf:DeclaredFieldType" minOccurs="0"
```

TABLE 6-continued

```
maxOccurs="unbounded"/>
        <element name="Resource" type="mpqf:ResourceType"
minOccurs="0" maxOccurs="unbounded"/>
    </sequence>
    <!-- Declaration of entities that can be reused in
OutputDescription or QueryCondition -->
</complexType>
<complexType name="DeclaredFieldType">
    <simpleContent>
        <extension base="mpqf:xPathType">
            <attribute name="id" type="ID" use="required/>
            <attribute name="typeName" type="string"
use="optional"/>
        </extension>
    </simpleContent>
</complexType>
<complexType name="ResourceType" abstract="true">
    <attribute name="resourceID" type="ID" use="required"/>
</complexType>
<complexType name="MediaResourceType">
    <complexContent>
        <extension base="mpqf:ResourceType">
            <sequence>
                <element name="MediaResource"
type="mpqf:MediaLocatorType"/>
            </sequence>
        </extension>
    </complexContent>
</complexType>
<complexType name="DescriptionResourceType">
    <complexContent>
        <extension base="mpqf:ResourceType">
            <sequence>
                <element name="AnyDescription">
                    <complexType mixed="true">
                        <sequence>
                            <any namespace="##any"/>
                        </sequence>
                    </complexType>
                </element>
            </sequence>
        </extension>
    </complexContent>
</complexType>
```

Table 7 defines a field type of the present invention in the QFDeclarationType shown in Table 6. Herein, QFDeclarationType is a field type of QFDeclaration and it includes DeclaredField as an element.

TABLE 7

| Name | Definition |
| --- | --- |
| DeclaredField | Describes a field including ID referred to by another field for field re-use. |

Table 8 below defines a field type of the present invention in the DeclaredFieldType shown in the Table 6. Herein, DeclaredFieldType is a field type of DeclaredField.

TABLE 8

| Name | Definition |
| --- | --- |
| DeclaredFieldType | A complex type extended from a token type format. It describes data paths based on metadata of an item. The data paths are described in an XPath format. TheXPath format represents the metadata of the item and selectively a related XPath format. Herein, the related XPath format indicates another field type by an ID for a field re-use. |

TABLE 8-continued

| Name | Definition |
|---|---|
| ID | An identifier assigned to each field. It may refer to another field by using a field ID during input query. |
| typeName | typeName describes schema of other metadata given by outputNameSpace or name of a complex data type defined by Mpeg7. It functions as a starting point of a related XPath format. |

Herein, token type is a unit distinguished in a series of text sequence and its range is broader than XPath.

The query expression unit 101 expresses a user query by using the field types described above. The query expression unit 101 can express the user query in an XML format.

The query analysis unit 103 shown in FIG. 1 parses a query expressed by the query expression unit 101 and analyzes the meaning of the query expressed by the query expression unit 101. The query analysis unit 103 analyzes the meaning of the query expressed by the query expression unit 101 and analyzes what fieldType ID 301, typeName 303, ref 305, and field values included in the expressed query stand for.

Herein, the ref 305 referring to the same ID 301 is analyzed to refer to the internal value of the same region. For instance, since [@height] and [@width] of [FeatureName] element commonly refer to a [visualCoding/Frame] field whose ID is [visualCodinFrameID] in the Table 5, it is analyzed that both [@height] and [@width] refer to the internal value of [visualCoding/Frame].

Based on the meaning of the analyzed query, the search engine 105 searches for related multimedia data and produces a search result.

The method of the present invention described above can be realized as a program and stored in a computer-readable recording medium, such as CD-ROM, RAM, ROM, floppy disks, hard disks, magneto-optical disks and the like. Since the process can be easily implemented by those skilled in the art to which the present invention pertains, further description will not be provided herein.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

The technology of the present invention can search MPEG-7 documents by using diverse queries, and make a secondary search over a region designated through a primary search.

What is claimed is:

1. A method for expressing a query inputted from a user for multimedia data search, the method comprising:
receiving a query for multimedia data search from a user, the query for multimedia data being of one of a plurality of types of query for multimedia data; and
expressing the inputted query in a field type regardless of a respective type of the query for multimedia data,
wherein the field type includes at least one among identifier information indicating identification (ID) information of a field presenting a search condition included in the inputted query; type information indicating data type information of the field; and reference information indicating identifier information of another field for reference, and
wherein the multimedia data search is performed with a secondary search over a region designated through a primary search by the field for field re-use, the region being re-used in the multimedia data search.

2. The method of claim 1, wherein the field type describes data paths by using metadata of an item,
wherein the data paths are described in XPath format, which expresses the metadata of the item,
wherein the fieldType expresses a selectively related XPath format,
wherein the related XPath format indicates a complex type of a schema given by outputNameSpace.

3. The method of claim 2, wherein the identifier information includes an identifier assigned to each field,
wherein another field may be referred to by using field identifier.

4. The method of claim 2, wherein the type information describes name of schema of another metadata given by outputNameSpace or composite data type defined in MPEG-7.

5. The method of claim 2, wherein the reference information is used to refer to a field identifier within a field.

6. The method of claim 1, wherein the field is included in QFDeclaration defined in MPEG-7 Standard and is DeclaredField for the field re-use,
wherein the field type of DeclaredField is of a composite type extended from a token type and describes data paths by using metadata of item,
wherein the data paths are described in XPath form, which represents metadata of item and selectively related XPath form, and
wherein the related XPath form indicates another field type by an ID for the field re-use.

7. The method of claim 6, wherein the identifier information includes an identifier assigned to each field,
wherein another field may be referred to by using field identifier.

8. The method of claim 6, wherein the type information describes name of schema of another metadata or composite data type defined in MPEG-7,
wherein the type information serves as starting point of related XPath form.

9. A search apparatus for searching multimedia data based on a query inputted from a user, the search apparatus comprising:
memory; and
a processor coupled to the memory and capable of performing operations comprising:
expressing the inputted query in a field type regardless of which one of a plurality of types of query for multimedia data the inputted query is; and
searching multimedia data based on the inputted query expressed in the field type,
wherein the field type includes at least one among identifier information indicating identification (ID) information of a field presenting a search condition included in the inputted query; type information indicating data type information of the field; and reference information indicating identifier information of another field for reference, and
wherein the searching of the multimedia data is performed with a secondary search over a region designated through a primary search by the field for field re-use, the region being re-used in the multimedia data search.

10. The search apparatus of claim 9, wherein the field type describes data paths by using metadata of an item,
  wherein the data paths are described in XPath format, which expresses the metadata of the item,
  wherein the fieldType expresses a selectively related XPath format,
  wherein the related XPath format indicates a complex type of a schema given by outputNameSpace.

11. The search apparatus of claim 10, wherein the identifier information includes an identifier assigned to each field,
  wherein another field may be referred to by using field identifier.

12. The search apparatus of claim 10, wherein the type information describes name of schema of another metadata given by outputNameSpace or composite data type defined in MPEG-7.

13. The search apparatus of claim 10, wherein the reference information is used to refer to a field identifier within a field.

14. The search apparatus of claim 9, wherein the field is included in QFDeclaration defined in MPEG-7 Standard and is DeclaredField for the field re-use,
  wherein the type of DeclaredField is of a composite type extended from a token type and describes data paths by using metadata of item,
  wherein the data paths are described in XPath form, which represents metadata of item and selectively related XPath form, and
  wherein the related XPath form indicates another field type by an ID for the field re-use.

15. The search apparatus of claim 14, wherein the identifier information includes an identifier assigned to each field,
  wherein another field may be referred to by using field identifier.

16. The search apparatus of claim 14, wherein the type information describes name of schema of another metadata given by outputNameSpace or composite data type defined in MPEG-7.

17. A recording medium for recording a data structure where a query inputted from a user is expressed in a field type for searching multimedia data based on the query, the data structure comprising:
  identifier information indicating identification (ID) information of a field presenting a search condition included in the inputted query for search of multimedia data, the inputted query being of one of a plurality of types of query for search of multimedia data;
  type information indicating data type information of the field; and
  reference information indicating identifier information of another field for reference,
  wherein the search of multimedia data is performed with a secondary search over a region designated through a primary search by the field for field re-use, the region being re-used in the multimedia data search.

18. The recording medium of claim 17, wherein the field type describes data paths by using metadata of an item,
  wherein the data paths are described in XPath format, which expresses the metadata of the item,
  wherein the fieldType expresses a selectively related XPath format,
  wherein the related XPath format indicates a complex type of a schema given by outputNameSpace.

19. The recording medium of claim 18, wherein the identifier information includes an identifier assigned to each field,
  wherein another field may be referred to by using field identifier.

20. The recording medium of claim 18, wherein the type information describes name of schema of another metadata given by outputNameSpace or composite data type defined in MPEG-7.

21. The recording medium of claim 18, wherein the reference information is used to refer to a field identifier within a field.

22. The recording medium of claim 17, wherein the field is included in QFDeclaration defined in MPEG-7 Standard and is DeclaredField for the field re-use,
  wherein the type of DeclaredField is of a composite type extended from a token type and describes data paths by using metadata of item,
  wherein the data paths are described in XPath form, which represents metadata of item and selectively related XPath form,
  wherein the related XPath form indicates another field type by an ID for the field re-use.

23. The recording medium of claim 22, wherein the identifier information includes an identifier assigned to each field,
  wherein another field may be referred to by using field identifier.

24. The recording medium of claim 22, wherein the type information describes name of schema of another metadata given by outputNameSpace or composite data type defined in MPEG-7.

* * * * *